(12) United States Patent
Afanasiev et al.

(10) Patent No.: US 10,053,620 B2
(45) Date of Patent: Aug. 21, 2018

(54) PROPPANT MATERIAL AND METHOD FOR PRODUCING SAME

(71) Applicant: OTKRYTOE AKTSYONERNOE OBSCHESTVO "ROSNEFT OIL COMPANY", Moscow (RU)

(72) Inventors: Vladimir Vladimirovich Afanasiev, Moscow (RU); Sergey Anatolievich Alkhimov, Moscow (RU); Nataliya Borisovna Bespalova, Moscow (RU); Egor Vladimirovich Shutko, Moscow (RU); Tatyana Modestovna Yumasheva, Moscow (RU)

(73) Assignee: OTKRYTOE AKTSYONERNOE OBSCHESTVO "ROSNEFT OIL COMPANY", Moscow (RU)

( * ) Notice: Subject to any disclaimer, the term of this patent is extended or adjusted under 35 U.S.C. 154(b) by 0 days.

(21) Appl. No.: 14/786,642

(22) PCT Filed: May 13, 2014

(86) PCT No.: PCT/RU2014/000340
§ 371 (c)(1),
(2) Date: Oct. 23, 2015

(87) PCT Pub. No.: WO2014/185823
PCT Pub. Date: Nov. 20, 2014

(65) Prior Publication Data
US 2016/0075939 A1 Mar. 17, 2016

(30) Foreign Application Priority Data
May 15, 2013 (RU) .............................. 2013122085 U

(51) Int. Cl.
C09K 8/60 (2006.01)
C09K 8/528 (2006.01)
C09K 8/80 (2006.01)
C08F 220/10 (2006.01)

(52) U.S. Cl.
CPC .............. *C09K 8/80* (2013.01); *C08F 220/10* (2013.01)

(58) Field of Classification Search
CPC ................................ C09K 8/80; C08F 220/10
USPC ....................................................... 507/224
See application file for complete search history.

(56) References Cited

U.S. PATENT DOCUMENTS

| | | | |
|---|---|---|---|
| 4,068,718 A | 1/1978 | Cooke, Jr. et al. | |
| 4,389,512 A | 6/1983 | Friedli et al. | |
| 4,451,633 A * | 5/1984 | Brownscombe | C08F 10/00 264/328.1 |
| 4,668,645 A | 5/1987 | Khaund | |
| 4,668,654 A | 5/1987 | Drake | |
| 7,931,087 B2 | 4/2011 | Gupta | |
| 2010/0139918 A1 | 6/2010 | Borisova et al. | |
| 2011/0144292 A1* | 6/2011 | Kojima | C07C 6/06 526/216 |
| 2012/0145390 A1 | 6/2012 | Parse et al. | |
| 2012/0205101 A1 | 8/2012 | Pribytkov et al. | |
| 2012/0247335 A1 | 10/2012 | Stutzman et al. | |
| 2013/0045901 A1 | 2/2013 | Bicerano | |

FOREIGN PATENT DOCUMENTS

| | | |
|---|---|---|
| CN | 1417241 A | 5/2003 |
| CN | 1592765 A | 3/2005 |
| EA | 000643 B1 | 12/1999 |
| EP | 2452958 A1 | 5/2012 |

(Continued)

OTHER PUBLICATIONS

The State Intellectual Property Office of the People's Republic of China First Office Action and Search Report issued in Chinese Patent Application No. 2014800228976, dated Sep. 21, 2016. [Chinese language].

(Continued)

*Primary Examiner* — Aiqun Li
(74) *Attorney, Agent, or Firm* — Mintz Levin Cohn Ferris Glovsky and Popeo, P.C.

(57) ABSTRACT

The material for proppant and method for producing the same relate to the chemistry of high-molecular weight compounds, and more particularly, to polymer materials with high requirements for physical and mechanical properties, for instance, for the production of proppants, i.e., propping granules, used in the oil and gas production by a method of hydraulic fracturing of formation. The technical result achieved by implementation of the present invention is an increase in thermal strength of the proppant material providing for a compressive strength of at least 150 MPa at a temperature of not less than 100° C. The method consists in the following. A mixture of oligocyclopentadienes is obtained by heating dicyclopentadiene (DCPD) to a temperature of 150-220° C. and holding at this temperature for 15-360 minutes. The oligomerization of dicyclopentadiene occurs. The mixture of oligomers is cooled down to 20-50° C., and polymer stabilizers, radical initiators, methacrylates and a catalyst are sequentially added thereto. The resultant polymer matrix is heated up to a temperature of 50-340° C. and is held at this temperature for 1-360 minutes, and thereafter is cooled down to room temperature. A metathesis polymerization (MP) and radical polymerization (RP) cross-linkage of the mixture of oligocyclopentadienes with methacrylic esters occurs.

4 Claims, No Drawings

(56) References Cited

FOREIGN PATENT DOCUMENTS

| RU | 2168518 C2 | 6/2001 |
|---|---|---|
| RU | 2386025 C1 | 4/2010 |
| RU | 2402572 C1 | 10/2010 |
| RU | 2465286 C2 | 10/2012 |

OTHER PUBLICATIONS

The State Intellectual Property Office of the People's Republic of China First Office Action and Search Report issued in Chinese Patent Application No. 2014800228976, dated Sep. 21, 2016. [English language translation].

* cited by examiner

PROPPANT MATERIAL AND METHOD FOR PRODUCING SAME

This application is a U.S. national-phase entry of Patent Cooperation Treaty Application No. PCT/RU2014/000340, which has an international filing date of May 13, 2014, and claims the priority of Russian Patent Application No. 2013122085, filed May 31, 2013. The specifications, claims, and figures of both the PCT and Russian applications are incorporated herein by reference in their entireties.

TECHNICAL FIELD

The invention relates to the chemistry of high-molecular weight compounds, namely, to polymer materials with higher requirements for physical and mechanical properties, specifically for the manufacture of proppants as propping granules used in oil and gas production by a method of hydraulic fracturing of formation.

BACKGROUND ART

A method of hydraulic fracturing of formation (HFF) consists in high pressure pumping a fluid into oil- and gas-bearing formations, thus facilitating the creation of fractures in the formation through which the oil or gas is flowing. To prevent the fracture healing, hard particles, generally, spherical pellets/granules called as proppants that fill the created fractures together with the carrier fluid, are admixed into the fluid being pumped. The proppants should withstand high formation pressures, be resistive to aggressive environments, and retain the physical and mechanical properties at high temperatures. Meanwhile, the proppant should have a density close to the carrier fluid density in order to be present in the fluid in suspended state and to be delivered to most remote fracture sites. Taking into account that water is most frequently used as the fluid for hydraulic fracturing, the proppant density should be close to the water density.

Mineral materials of the natural origin, such as bauxites, kaolins and sands, are frequently used as an initial material for the production of proppants (U.S. Pat. Nos. 4,068,718 and 4,668,645).

It is known to use various materials, such as a borosilicate or calcinated glass, ferrous and non-ferrous metals or alloys thereof, metal oxides, oxides, nitrides and carbides of silicon, for the production of proppants having a shape of hollow pellets (US patent application No. 2012/0145390).

Disadvantages of these materials are a high technological complexity of production of the hollow pellets therefrom, their insufficient compression strength due to the hollow structure and the material fragility, a high degree of proppant breakdown in fractures, and a reverse carry-over of particles and their fragments.

Technical solutions for the production of proppants with a polymeric coating are aimed at the removal of such disadvantages. Such cover works as a compensator of point stresses, thereby more uniformly distributing the pressure throughout the proppant surface and volume, and, moreover, reduces the average proppant density. Widely known is the use of various organic polymeric and non-organic proppant coatings in the form of epoxy and phenol resins (US patent applications Nos. 2012/0205101, 2012/247335).

Disadvantages of these technical solutions are the complexity of producing such proppants, insufficient thermal resistance of the coatings, low ovality and sphericity factors due to the shape of mineral proppant core, and a high spread of physical and mechanical characteristics.

It is known to use a wide spectrum of thermosetting polymers with cross-linkages such as epoxy, vinyl and phenol compounds, polyurethane, polyester, melamine, etc., as the material for producing proppants (US patent application No. 2013/0045901).

Known is the use of polyamide as the material for producing proppants (U.S. Pat. No. 7,931,087).

A disadvantage of the known materials is an inconformity of physical and mechanical properties of these materials simultaneously with the entire combination of requirements applicable to proppant materials. For instance, this is referred to an insufficient resistance to aggressive environments, an insufficient thermal resistance and thermal strength, degree of swelling in liquid hydrocarbons media, compression strength.

A closest technical solution to the proposed one is the use of polydicyclopentadiene as the material for proppant (RU patent No. 2386025).

Disadvantage of the use of polydicyclopentadiene is an insufficient temperature resistance and compressive strength.

DISCLOSURE OF THE INVENTION

An objective of the present invention is to obtain a material having a set of properties required for the proppants operating in heavy conditions.

A technical result achieved by implementation of the present invention consists in an increase of thermal strength of the proppant material providing for a compressive strength of at least 150 MPa at a temperature of not less than 100° C.

The technical result is achieved by that the material for proppant represents a metathesis-radically cross-linked mixture of oligocyclopentadienes and methacrylates. The technical result is achieved also by a method including heating dicyclopentadiene to a temperature of 150-220° C. and holding at this temperature for 15-360 minutes, cooling the obtained mixture of oligocyclopentadienes up to 20-50° C., sequentially adding the following components to the mixture: at least one of polymer stabilizers as which compounds selected from the following group are used (note that the relevant abbreviations are indicated in round parenthesis after each compound name): tetrakis[methylene(3,5-di-tert-butyl-4-hydroxyhydrocinnamate)]methane (1010), 2,6-di-tert-butyl-4-(dimethylamino)phenol (703), 1,3,5-trimethyl-2,4,6-tris(3,5-di-tert-butyl-4-hydroxybenzyl)benzene (330), tris(4-tert-butyl-3-hydroxy-2,6-dimethylbenzyl)isocyanurate (14), 3,5-di-tert-butyl-4-hydroxyanisole (354), 4,4'-methylenebis(2,6-di-tert-butylphenol) (702), diphenylamine (DPA), para-di-tert-butylphenylenediamine (5057), N,N'-diphenyl-1,4-phenylenediamine (DPPD), tris(2,4-di-tert-butylphenyl)phosphite (168), tris(nonylphenyl)phosphite (TNPP), bis(2,2,6,6-tetramethyl-4-piperidinyl)sebacate (770), bis(1-octyloxy-2,2,6,6-tetramethyl-4-piperidinyl)sebacate (123), bis(1-methyl-2,2,6,6-tetramethyl-4-piperidinyl)sebacate (292), 2-tert-butyl-6-(5-chloro-2H-benzotriazol-2-yl)-4-methylphenol (327), 2-(2H-benzotriazol-2-yl)-4,6-bis(1-methyl-1-phenyl)phenol (234); at least one of radical initiators selected from the following group: di-tert-butyl peroxide (B), dicumyl peroxide (BC-FF), 2,3-dimethyl-2,3-diphenylbutane (30), triphenylmethane (TPM); at least one of methacrylates selected from the following group: allyl methacrylate (AMA), glycidyl methacrylate (GMA), ethylene glycol dimethacrylate (EGDMA), diethylene glycol dimethacrylate (DEGDMA), butylene glycol dimethacrylate (BGDMA), 2-hydroxyethyl methacrylate (HEMA), 2-hydroxypropyl methacrylate (HPMA), tricyclodecane dimethanol dimethacrylate (TCDDMA), ethoxylated bisphenol A dimethacrylate (E2BADMA), trimethylolpropane trimethacrylate (TMPTMA); and a catalyst as which a compound of the following general formula is used:

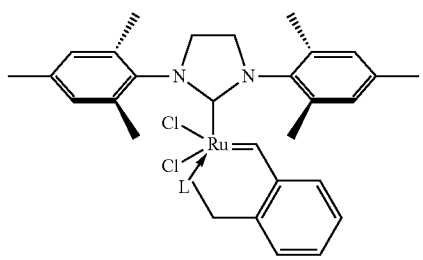

where a substituent L is selected from the following group:

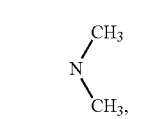
N1

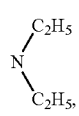
N2

N3

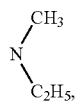
N4

(CH₂)₂OMe,

N5

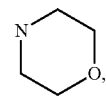
N5b

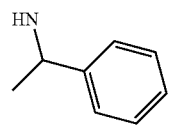
N1a

N6a

-continued

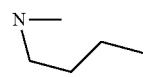
N11a

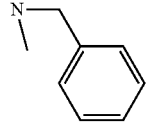
N16a

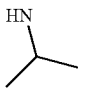
N1b

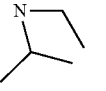
N2a

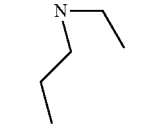
N7a

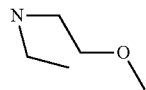
N12a

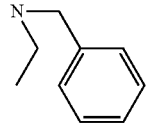
N17a

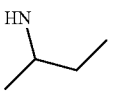
N2b

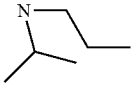
N3a

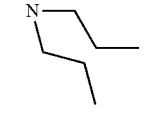
N8a

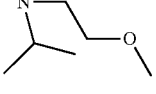
N13a

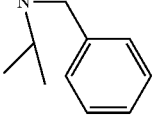
N18a

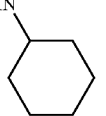
N3b

N4a 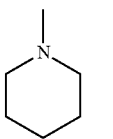

N9a 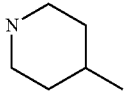

N14a 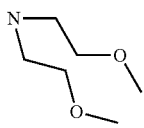

N19a 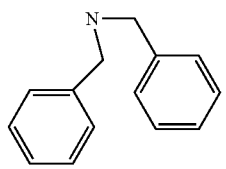

N4b 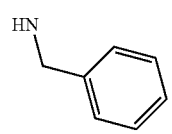

N5a 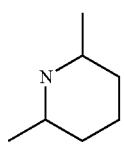

N10a 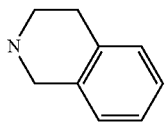

N15a 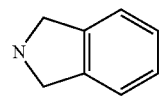

N20a 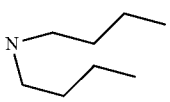

N1c 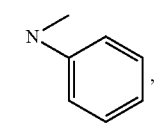

the polymer matrix produced is heated up to a temperature of 50-340° C. and is held at this temperature for 1-360 minutes, and thereafter is cooled down to room temperature. The components of the polymer matrix are present in the following amounts, wt. %:
  the polymer stabilizers 0.1-3;
  the radical initiators 0.1-4;
  the methacrylates 0.3-30;
  the catalyst 0.001-0.02;
  the mixture of oligocyclopentadienes being the balance.
The said characteristic features are essential.

A polymer material of the metathesis-radically cross-linked mixture of oligocyclopentadienes and methacrylates produced by using simultaneously metathesis catalysts and radical initiators has a substantially higher glass transition temperature that is within the range of 190-340° C., and better mechanical characteristics in comparison with polydicyclopentadiene having a glass transition temperature not higher than 130° C. For several samples, the glass transition temperature exceeds 350° C. and cannot be determined because it approaches to the polymer destruction onset temperature, the compressive strength increases up to 150 MPa. A value of linear thermal expansion ratio is decreased. An extremely important feature is the resistance to organic solvents, and a percentage of swelling in toluene does not exceed 3% after holding for a month. In comparison to polydicyclopentadiene, the present material has a greater tensile and compressive strength at high temperatures, which is particularly important for the manufacture of proppants.

BEST MODE FOR CARRYING OUT THE INVENTION

The production of a material for proppant in the form of a metathesis-radically cross-linked mixture of oligomers of cyclopentadiene (CP) and of methacrylates is performed as follows.

A mixture of oligocyclopentadienes is obtained by heating dicyclopentadiene (DCPD) to a temperature of 150-220° C. and holding at this temperature for 15-360 minutes. The oligomerization of dicyclopentadiene proceeds according to the following scheme:

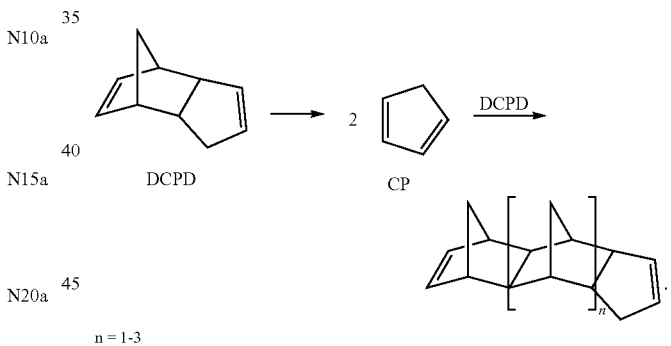

n = 1-3

The mixture of oligomers is cooled down to 20-50° C., and the polymer stabilizers, radical initiators, methacrylates and catalyst are sequentially added thereto. Thus, a polymer matrix of the following composition is obtained, wt. %:
  the polymer stabilizers 0.1-3;
  the radical initiators 0.1-4;
  the methacrylates 0.3-30;
  the catalyst 0.001-0.02;
  the mixture of oligocyclopentadienes being the balance.

The polymer matrix is heated up to a temperature of 50-340° C. and is held at this temperature for 1-360 minutes, and thereafter is cooled down to room temperature. A metathesis polymerization (MP) and radical polymerization (RP) cross-linkage of the mixture of oligocyclopentadienes with methacrylic esters occurs according to the following scheme:

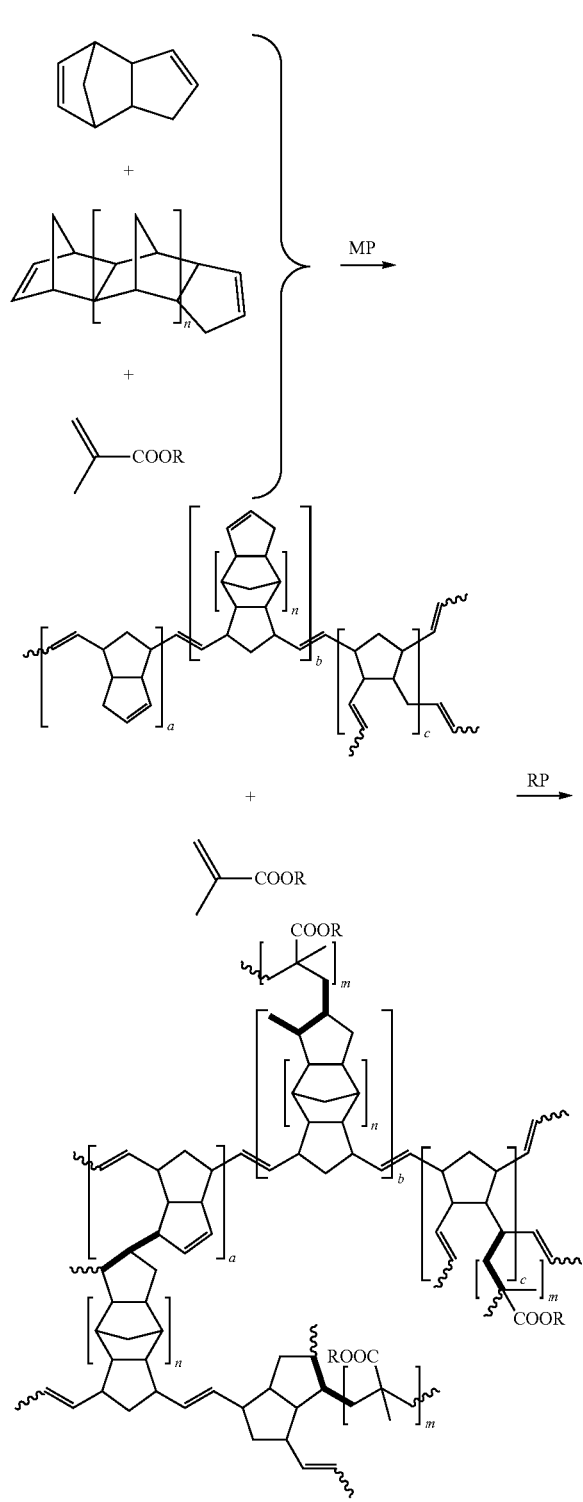

As a result, the material for proppant is obtained that is classified according to the following parameters:

Glass transition temperature (Tg)
A: more than 250° C.
B: 201 to 250° C.
C: 170 to 200° C.
D: less than 170° C.

Compressive strength, MPa
A: more than 250
B: 170 to 249
C: 120 to 169
D: less than 120

Swelling in oil (100° C./1 week)
A: less than 1%
B: 1.1 to 3%
C: 3.1 to 5%
D: more than 5%.

EXAMPLES EMBODIMENTS OF THE INVENTION

Example 1

In a separate vessel, a solution containing dicyclopentadiene, and polymer stabilizers 1010 (0.30 wt. %), 168 (0.40 wt. %) and 770 (0.40 wt. %) is prepared. The mixture is heated in an autoclave to 170° C., is held at the predetermined temperature for 60 minutes, and is cooled down to room temperature. Radical initiators B (2.0 wt. %) and 30 (2.0 wt. %), and methacrylate EGDMA (1.00 wt. %) are added to the resulting mixture. Catalyst N3a (0.0275 wt. %) is added at 25° C. This mixture is stirred for 10 minutes, thereafter the polymer matrix obtained is heated up to a temperature of 260° C., is held at this temperature for 360 minutes, and thereafter is cooled down to room temperature. The material for proppant with the following properties is obtained thereby: Tg (B), compressive strength (B), and swelling (B).

Example 2

In a separate vessel, a solution containing dicyclopentadiene, and polymer stabilizers 330 (0.50 wt. %) and 168 (0.50 wt. %) is prepared. The mixture is heated in an autoclave to 160° C., is held at the predetermined temperature for 60 minutes, and is cooled down to room temperature. A radical initiator B (0.1 wt. %), and methacrylates HEMA (4.00 wt. %) and GMA (3.00 wt. %) are added to the resulting mixture. Catalyst N (0.0089 wt. %) is added at 35° C. This mixture is stirred for 40 minutes, thereafter the polymer matrix obtained is heated up to a temperature of 200° C. and is held at this temperature for 30 minutes, and thereafter is cooled down to room temperature. The material for proppant with the following properties is obtained thereby: Tg (C), compressive strength (B), and swelling (C).

Example 3

In a separate vessel, a solution containing dicyclopentadiene, and polymer stabilizers 1010 (0.40 wt. %) and 168 (0.40 wt. %) is prepared. The mixture is heated in an autoclave to 155° C., is held at the predetermined temperature for 240 minutes, and is cooled down to room temperature. A radical initiator BC-FF (1.5 wt. %), and methacrylates EGDMA (0.50 wt. %) and TMPTMA (5.0 wt. %) are added to the resulting mixture. Catalyst N7a (0.0068 wt. %) is added at 25° C. This mixture is stirred for 10 minutes, thereafter is heated up to a temperature of 150° C. and is held at this temperature for 20 minutes, and thereafter is cooled down to room temperature. The material for proppant with the following properties is obtained thereby: Tg (C), compressive strength (B), and swelling (C).

Example 4

In a separate vessel, a solution containing dicyclopentadiene, and polymer stabilizers DPA (0.40 wt. %), 168 (0.50 wt. %) and 234 (0.20 wt. %) is prepared. The mixture is heated in an autoclave to 150° C., is held at the predetermined temperature for 60 minutes, and is cooled down to room temperature. A radical initiator B (1.0 wt. %), and methacrylate E2BADMA (6.00 wt. %) are added to the resulting mixture. Catalyst N5a (0.0123 wt. %) is added at 10° C. This mixture is stirred for 2 minutes, thereafter is heated up to a temperature of 200° C. and is held at this temperature for 30 minutes, and thereafter is cooled down to room temperature. The material for proppant with the following properties is obtained thereby: Tg (A), compressive strength (A), and swelling (A).

Example 5

In a separate vessel, a solution containing dicyclopentadiene, and polymer stabilizers 1010 (0.40 wt. %), 168 (0.80 wt. %) and 770 (0.40 wt. %) is prepared. The mixture is heated in an autoclave to 150° C., is held at the predetermined temperature for 160 minutes, and is cooled down to room temperature. A radical initiator B (1.0 wt. %), and methacrylate TMPTMA (0.50 wt. %) are added to the resulting mixture. Catalyst N1 (0.0098 wt. %) is added at 50° C. This mixture is stirred for 5 minutes, thereafter is heated up to a temperature of 200° C. and is held at this temperature for 360 minutes, and thereafter is cooled down to room temperature. The material for proppant with the following properties is obtained thereby: Tg (C), compressive strength (B), and swelling (C).

Example 6

In a separate vessel, a solution containing dicyclopentadiene, and polymer stabilizers 702 (0.30 wt. %) and 168 (0.50 wt. %) is prepared. The mixture is heated in an autoclave to 160° C., is held at the predetermined temperature for 180 minutes, and is cooled down to room temperature. Radical initiators BC-FF (1.5 wt. %) and 30 (2.5 wt. %), and methacrylates TCDDMA (20.00 wt. %) and E2BADMA (5.0 wt. %) are added to the resulting mixture. Catalyst N14a (0.0064 wt. %) is added at 25° C. This mixture is stirred for 10 minutes, thereafter is heated up to a temperature of 250° C. and is held at this temperature for 45 minutes, and thereafter is cooled down to room temperature. The material for proppant with the following properties is obtained thereby: Tg (A), compressive strength (A), and swelling (A).

Example 7

In a separate vessel, a solution containing dicyclopentadiene, and polymer stabilizers 1010 (0.20 wt. %) and TNPP (0.50 wt. %) is prepared. The mixture is heated in an autoclave to 150° C., is held at the predetermined temperature for 240 minutes, and is cooled down to room temperature. Radical initiators B (1.0 wt. %) and 30 (2.0 wt. %), and methacrylates BGDMA (1.00 wt. %) and HPMA (1.0 wt. %) are added to the resulting mixture. Catalyst N17a (0.0087 wt. %) is added at 20° C. This mixture is stirred for 5 minutes, thereafter is heated up to a temperature of 340° C. and is held at this temperature for 10 minutes, and thereafter is cooled down to room temperature. The material for proppant with the following properties is obtained thereby: Tg (A), compressive strength (C), and swelling (A).

Example 8

In a separate vessel, a solution containing dicyclopentadiene, and polymer stabilizers 330 (0.50 wt. %), 168 (0.50 wt. %) and 770 (0.50 wt. %) is prepared. The mixture is heated in an autoclave to 150° C., is held at the predetermined temperature for 60 minutes, and is cooled down to room temperature. A radical initiator B (0.5 wt. %) and methacrylate TMPTMA (1.00 wt. %) are added to the resulting mixture. Catalyst N4 (0.0167 wt. %) is added at 25° C. This mixture is stirred for 10 minutes, thereafter is heated up to a temperature of 150° C. and is held at this temperature for 30 minutes, and thereafter is cooled down to room temperature. The material for proppant with the following properties is obtained thereby: Tg (C), compressive strength (B), and swelling (C).

Example 9

In a separate vessel, a solution containing dicyclopentadiene, and polymer stabilizers 702 (0.20 wt. %), 168 (0.50 wt. %) and 123 (0.50 wt. %) is prepared. The mixture is heated in an autoclave to 160° C., is held at the predetermined temperature for 120 minutes, and is cooled down to room temperature. A radical initiator BC-FF (1.0 wt. %) and methacrylate EGDMA (3.00 wt. %) are added to the resulting mixture. Catalyst N5 (0.0122 wt. %) is added at 10° C. This mixture is stirred for 5 minutes, thereafter is heated up to a temperature of 200° C. and is held at this temperature for 30 minutes, and thereafter is cooled down to room temperature. The material for proppant with the following properties is obtained thereby: Tg (C), compressive strength (B), and swelling (C).

Example 10

In a separate vessel, a solution containing dicyclopentadiene, and polymer stabilizers 1010 (0.20 wt. %), 168 (0.50 wt. %) and 292 (0.50 wt. %) is prepared. The mixture is heated in an autoclave to 180° C., is held at the predetermined temperature for 60 minutes, and is cooled down to room temperature. Radical initiators B (1.0 wt. %) and 30 (3.0 wt. %), and methacrylate TMPTMA (2.50 wt. %) are added to the resulting mixture. Catalyst N19a (0.0241 wt. %) is added at 0° C. This mixture is stirred for 1 minute, thereafter is heated up to a temperature of 265° C. and is held at this temperature for 60 minutes, and thereafter is cooled down to room temperature. The material for proppant with the following properties is obtained thereby: Tg (A), compressive strength (B), and swelling (A).

Example 11

In a separate vessel, a solution containing dicyclopentadiene, and polymer stabilizers 702 (0.50 wt. %), 168 (0.50 wt. %) and 770 (0.50 wt. %) is prepared. The mixture is heated in an autoclave to 150° C., is held at the predetermined temperature for 180 minutes, and is cooled down to room temperature. A radical initiator BC-FF (2.0 wt. %), and methacrylates GMA (2.00 wt. %) and EGDMA (3.0 wt. %) are added to the resulting mixture. Catalyst N2a (0.0158 wt. %) is added at 30° C. This mixture is stirred for 20 minutes, thereafter is heated up to a temperature of 250° C. and is held at this temperature for 30 minutes, and thereafter is cooled down to room temperature. The material for proppant with the following properties is obtained thereby: Tg (B), compressive strength (A), and swelling (B).

Example 12

In a separate vessel, a solution containing dicyclopentadiene, and polymer stabilizer 702 (0.10 wt. %) is prepared.

The mixture is heated in an autoclave to 160° C., is held at the predetermined temperature for 120 minutes, and is cooled down to room temperature. Radical initiators BC-FF (0.1 wt. %) and 30 (1.5 wt. %), and methacrylate TCDDMA (1.20 wt. %) are added to the resulting mixture. Catalyst N1a (0.0033 wt. %) is added at 30° C. This mixture is stirred for 10 minutes, thereafter is heated up to a temperature of 280° C. and is held at this temperature for 1 minute, and thereafter is cooled down to room temperature. The material for proppant with the following properties is obtained thereby: Tg (B), compressive strength (B), and swelling (B).

Example 13

In a separate vessel, a solution containing dicyclopentadiene, and polymer stabilizers 1010 (0.37 wt. %), 168 (0.10 wt. %) and 770 (0.47 wt. %) is prepared. The mixture is heated in an autoclave to 155° C., is held at the predetermined temperature for 280 minutes, and is cooled down to room temperature. Radical initiators BC-FF (1.0 wt. %) and 30 (1.0 wt. %), and methacrylates HEMA (2.50 wt. %) and GMA (5.0 wt. %) are added to the resulting mixture. Catalyst N1c (0.0106 wt. %) is added at 20° C. This mixture is stirred for 5 minutes, thereafter is heated up to a temperature of 310° C. and is held at this temperature for 5 minutes, and thereafter is cooled down to room temperature. The material for proppant with the following properties is obtained thereby: Tg (A), compressive strength (B), and swelling (A).

Example 14

In a separate vessel, a solution containing dicyclopentadiene, and polymer stabilizers 1010 (0.50 wt. %) and 168 (0.50 wt. %) is prepared. The mixture is heated in an autoclave to 150° C., is held at the predetermined temperature for 60 minutes, and is cooled down to room temperature. Radical initiators B (1.0 wt. %) and 30 (1.0 wt. %), and methacrylates BGDMA (2.50 wt. %) and AMA (0.5 wt. %) are added to the resulting mixture. Catalyst N6a (0.0059 wt. %) is added at 25° C. This mixture is stirred for 10 minutes, thereafter is heated up to a temperature of 300° C. and is held at this temperature for 30 minutes, and thereafter is cooled down to room temperature. The material for proppant with the following properties is obtained thereby: Tg (A), compressive strength (B), and swelling (A).

Example 15

In a separate vessel, a solution containing dicyclopentadiene, and polymer stabilizers 702 (0.20 wt. %), 168 (0.40 wt. %) and 770 (0.40 wt. %) is prepared. The mixture is heated in an autoclave to 150° C., is held at the predetermined temperature for 240 minutes, and is cooled down to room temperature. Radical initiators BC-FF (1.0 wt. %) and TPM (1.0 wt. %), and methacrylate EGDMA (0.50 wt. %) are added to the resulting mixture. Catalyst N9a (0.0023 wt. %) is added at 15° C. This mixture is stirred for 10 minutes, thereafter is heated up to a temperature of 270° C. and is held at this temperature for 30 minutes, and thereafter is cooled down to room temperature. The material for proppant with the following properties is obtained thereby: Tg (C), compressive strength (B), and swelling (C).

Example 16

In a separate vessel, a solution containing dicyclopentadiene, and polymer stabilizers 5057 (0.40 wt. %) and TNPP (0.80 wt. %) is prepared. The mixture is heated in an autoclave to 170° C., is held at the predetermined temperature for 180 minutes, and is cooled down to room temperature. A radical initiator BC-FF (1.0 wt. %) and methacrylate EGDMA (1.00 wt. %) are added to the resulting mixture. Catalyst N2 (0.0122 wt. %) is added at 25° C. This mixture is stirred for 10 minutes, thereafter is heated up to a temperature of 270° C. and is held at this temperature for 45 minutes, and thereafter is cooled down to room temperature. The material for proppant with the following properties is obtained thereby: Tg (C), compressive strength (A), and swelling (B).

Example 17

In a separate vessel, a solution containing dicyclopentadiene, and polymer stabilizers 1010 (0.45 wt. %) and 168 (0.45 wt. %) is prepared. The mixture is heated in an autoclave to 160° C., is held at the predetermined temperature for 360 minutes, and is cooled down to room temperature. A radical initiator BC-FF (0.5 wt. %), and methacrylate E2BADMA (18.00 wt. %) are added to the resulting mixture. Catalyst N10a (0.0059 wt. %) is added at 5° C. This mixture is stirred for 10 minutes, thereafter is heated up to a temperature of 170° C., and is held at this temperature for 30 minutes, and thereafter is cooled down to room temperature. The material for proppant with the following properties is obtained thereby: Tg (C), compressive strength (B), and swelling (C).

Example 18

In a separate vessel, a solution containing dicyclopentadiene, and polymer stabilizers 702 (0.45 wt. %) and 168 (0.45 wt. %) is prepared. The mixture is heated in an autoclave to 160° C., is held at the predetermined temperature for 160 minutes, and is cooled down to room temperature. A radical initiator BC-FF (0.5 wt. %), and methacrylates TCDDMA (0.80 wt. %) and TMPTMA (5.0 wt. %) are added to the resulting mixture. Catalyst N11a (0.0096 wt. %) is added at 25° C. This mixture is stirred for 10 minutes, thereafter is heated up to a temperature of 200° C. and is held at this temperature for 60 minutes, and thereafter is cooled down to room temperature. The material for proppant with the following properties is obtained thereby: Tg (C), compressive strength (B), and swelling (C).

Example 19

In a separate vessel, a solution containing dicyclopentadiene, and polymer stabilizers 168 (0.36 wt. %), 168 (0.72 wt. %) and 123 (0.45 wt. %) is prepared. The mixture is heated in an autoclave to 190° C., is held at the predetermined temperature for 50 minutes, and is cooled down to room temperature. Radical initiators BC-FF (0.5 wt. %) and 30 (2.0 wt. %), and methacrylate EGDMA (2.00 wt. %) are added to the resulting mixture. Catalyst N3b (0.0071 wt. %) is added at 30° C. This mixture is stirred for 10 minutes, thereafter is heated up to a temperature of 250° C. and is held at this temperature for 30 minutes, and thereafter is cooled down to room temperature. The material for proppant with the following properties is obtained thereby: Tg (B), compressive strength (A), and swelling (A).

Example 20

In a separate vessel, a solution containing dicyclopentadiene, and polymer stabilizers 703 (0.45 wt. %) and 770

(0.45 wt. %) is prepared. The mixture is heated in an autoclave to 155° C., is held at the predetermined temperature for 280 minutes, and is cooled down to room temperature. Radical initiators BC-FF (1.0 wt. %) and 30 (1.5 wt. %), and methacrylate TMPTMA (1.50 wt. %) are added to the resulting mixture. Catalyst N5a (0.0129 wt. %) is added at 30° C. This mixture is stirred for 10 minutes, thereafter is heated up to a temperature of 260° C. and is held at this temperature for 30 minutes, and thereafter is cooled down to room temperature. The material for proppant with the following properties is obtained thereby: Tg (A), compressive strength (A), and swelling (A).

Example 21

In a separate vessel, a solution containing dicyclopentadiene, and polymer stabilizers 1010 (0.35 wt. %), 327 (0.20 wt. %) and 770 (0.50 wt. %) is prepared. The mixture is heated in an autoclave to 160° C., is held at the predetermined temperature for 180 minutes, and is cooled down to room temperature. Radical initiators B (0.1 wt. %) and 30 (2.0 wt. %), and methacrylate EGDMA (2.50 wt. %) are added to the resulting mixture. Catalyst N12a (0.0083 wt. %) is added at 25° C. This mixture is stirred for 10 minutes, thereafter is heated up to a temperature of 270° C. and is held at this temperature for 30 minutes, and thereafter is cooled down to room temperature. The material for proppant with the following properties is obtained thereby: Tg (A), compressive strength (B), and swelling (A).

Example 22

In a separate vessel, a solution containing dicyclopentadiene, and polymer stabilizers 1010 (0.02 wt. %), 168 (0.04 wt. %) and 770 (0.04 wt. %) is prepared. The mixture is heated in an autoclave to 160° C., is held at the predetermined temperature for 120 minutes, and is cooled down to room temperature. A radical initiator BC-FF (1.0 wt. %), and methacrylates EGDMA (2.00 wt. %) and GMA (5.0 wt. %) are added to the resulting mixture. Catalyst N15a (0.0099 wt. %) is added at 25° C. This mixture is stirred for 10 minutes, thereafter is heated up to a temperature of 170° C. and is held at this temperature for 30 minutes, and thereafter is cooled down to room temperature. The material for proppant with the following properties is obtained thereby: Tg (C), compressive strength (A), and swelling (B).

Example 23

In a separate vessel, a solution containing dicyclopentadiene, and polymer stabilizers 14 (0.40 wt. %), 168 (0.80 wt. %) and 770 (0.40 wt. %) is prepared. The mixture is heated in an autoclave to 150° C., is held at the predetermined temperature for 60 minutes, and is cooled down to room temperature. A radical initiator BC-FF (1.0 wt. %), and methacrylates E2BADMA (25.00 wt. %) and TMPTMA (5.0 wt. %) are added to the resulting mixture. Catalyst N4a (0.0089 wt. %) is added at 25° C. This mixture is stirred for 10 minutes, thereafter is heated up to a temperature of 200° C. and is held at this temperature for 30 minutes, and thereafter is cooled down to room temperature. The material for proppant with the following properties is obtained thereby: Tg (C), compressive strength (B), and swelling (C).

Example 24

In a separate vessel, a solution containing dicyclopentadiene, and polymer stabilizers 1010 (0.50 wt. %) and 168 (0.50 wt. %) is prepared. The mixture is heated in an autoclave to 155° C., is held at the predetermined temperature for 180 minutes, and is cooled down to room temperature. A radical initiator B (0.1 wt. %), and methacrylate BGDMA (2.20 wt. %) are added to the resulting mixture. Catalyst N3 (0.0096 wt. %) is added at 25° C. This mixture is stirred for 10 minutes, then is heated up to a temperature of 180° C. and is held at this temperature for 30 minutes, and thereafter is cooled down to room temperature. The material for proppant with the following properties is obtained thereby: Tg (C), compressive strength (B), and swelling (C).

Example 25

In a separate vessel, a solution containing dicyclopentadiene, and polymer stabilizers 330 (0.45 wt. %), TNPP (0.45 wt. %) and 292 (0.45 wt. %) is prepared. The mixture is heated in an autoclave to 150° C., is held at the predetermined temperature for 60 minutes, and is cooled down to room temperature. Radical initiators BC-FF (1.0 wt. %) and 30 (2.0 wt. %), and methacrylates EGDMA (2.00 wt. %) and E2BADMA (3.0 wt. %) are added to the resulting mixture. Catalyst N16a (0.0082 wt. %) is added at 30° C. This mixture is stirred for 1 minute, thereafter is heated up to a temperature of 260° C. and is held at this temperature for 30 minutes, and thereafter is cooled down to room temperature. The material for proppant with the following properties is obtained thereby: Tg (A), compressive strength (A), and swelling (A).

Example 26

In a separate vessel, a solution containing dicyclopentadiene, and polymer stabilizers 702 (0.40 wt. %) and 327 (0.20 wt. %) is prepared. The mixture is heated in an autoclave to 155° C., is held at the predetermined temperature for 300 minutes, and is cooled down to room temperature. Radical initiators BC-FF (1.0 wt. %) and 30 (1.0 wt. %), and methacrylates EGDMA (1.00 wt. %) and BGDMA (5.0 wt. %) are added to the resulting mixture. Catalyst N20a (0.0050 wt. %) is added at 15° C. This mixture is stirred for 10 minutes, thereafter is heated up to a temperature of 255° C. and is held at this temperature for 30 minutes, and thereafter is cooled down to room temperature. The material for proppant with the following properties is obtained thereby: Tg (A), compressive strength (B), and swelling (A).

Example 27

In a separate vessel, a solution containing dicyclopentadiene, and polymer stabilizers 330 (0.40 wt. %), 168 (0.50 wt. %) and 770 (0.50 wt. %) is prepared. The mixture is heated in an autoclave to 155° C., is held at the predetermined temperature for 300 minutes, and is cooled down to room temperature. A radical initiator B (2.0 wt. %) and methacrylate BGDMA (3.00 wt. %) are added to the resulting mixture. Catalyst N1b (0.0066 wt. %) is added at 30° C. This mixture is stirred for 10 minutes, thereafter is heated up to a temperature of 200° C. and is held at this temperature for 120 minutes, and thereafter is cooled down to room temperature. The material for proppant with the following properties is obtained thereby: Tg (C), compressive strength (B), and swelling (C).

Example 28

In a separate vessel, a solution containing dicyclopentadiene, and polymer stabilizers 1010 (1.50 wt. %), TNPP (1.00 wt. %) and 123 (1.50 wt. %) is prepared. The mixture is heated in an autoclave to 175° C., is held at the predetermined temperature for 180 minutes, and is cooled down to room temperature. A radical initiator B (1.0 wt. %), and methacrylates DEGDMA (8.00 wt. %) and E2BADMA (5.0 wt. %) are added to the resulting mixture. Catalyst N13a (0.0088 wt. %) is added at 25° C. This mixture is stirred for 10 minutes, thereafter is heated up to a temperature of 220° C. and is held at this temperature for 30 minutes, and thereafter is cooled down to room temperature. The material for proppant with the following properties is obtained thereby: Tg (B), compressive strength (A), and swelling (B).

Example 29

In a separate vessel, a solution containing dicyclopentadiene, and polymer stabilizers 1010 (0.20 wt. %), 168 (0.50 wt. %) and 292 (0.50 wt. %) is prepared. The mixture is heated in an autoclave to 220° C., is held at the predetermined temperature for 15 minutes, and is cooled down to room temperature. A radical initiator BC-FF (1.0 wt. %), and methacrylate EGDMA (2.00 wt. %) are added to the resulting mixture. Catalyst N18a (0.0135 wt. %) is added at 10° C. This mixture is stirred for 5 minutes, thereafter is heated up to a temperature of 200° C. and is held at this temperature for 30 minutes, and thereafter is cooled down to room temperature. The material for proppant with the following properties is obtained thereby: Tg (C), compressive strength (B), and swelling (C).

Example 30

In a separate vessel, a solution containing dicyclopentadiene, and polymer stabilizers 354 (1.00 wt. %) and 770 (0.50 wt. %) is prepared. The mixture is heated in an autoclave to 155° C., is held at the predetermined temperature for 300 minutes, and is cooled down to room temperature. Radical initiators BC-FF (1.0 wt. %) and 30 (1.0 wt. %), and methacrylate BGDMA (1.00 wt. %) are added to the resulting mixture. Catalyst N2b (0.0069 wt. %) is added at 45° C. This mixture is stirred for 10 minutes, thereafter is heated up to a temperature of 275° C. and is held at this temperature for 30 minutes, and thereafter is cooled down to room temperature. The material for proppant with the following properties is obtained thereby: Tg (A), compressive strength (B), and swelling (A).

Example 31

In a separate vessel, a solution containing dicyclopentadiene, and polymer stabilizers 1010 (0.40 wt. %), TNPP (0.40 wt. %) and 770 (0.40 wt. %) is prepared. The mixture is heated in an autoclave to 200° C., is held at the predetermined temperature for 60 minutes, and is cooled down to room temperature. A radical initiator BC-FF (1.0 wt. %), and methacrylates GMA (1.50 wt. %) and HPMA (3.0 wt. %) are added to the resulting mixture. Catalyst N8a (0.0098 wt. %) is added at 25° C. This mixture is stirred for 10 minutes, thereafter is heated up to a temperature of 170° C. and is held at this temperature for 240 minutes, and thereafter is cooled down to room temperature. The material for proppant with the following properties is obtained thereby: Tg (C), compressive strength (B), and swelling (C).

Example 32

In a separate vessel, a solution containing dicyclopentadiene, and polymer stabilizers 702 (0.37 wt. %), 168 (0.73 wt. %) and 770 (0.37 wt. %) is prepared. The mixture is heated in an autoclave to 165° C., is held at the predetermined temperature for 240 minutes, and is cooled down to room temperature. A radical initiator BC-FF (1.0 wt. %), and methacrylate EGDMA (1.00 wt. %) are added to the resulting mixture. Catalyst N4b (0.0093 wt. %) is added at 30° C. This mixture is stirred for 10 minutes, thereafter is heated up to a temperature of 200° C. and is held at this temperature for 60 minutes, and thereafter is cooled down to room temperature. The material for proppant with the following properties is obtained thereby: Tg (C), compressive strength (B), and swelling (C).

Example 33

In a separate vessel, a solution containing dicyclopentadiene, and polymer stabilizers DPPD (0.4 wt. %), 168 (0.73 wt. %) and 770 (0.37 wt. %) is prepared. The mixture is heated in an autoclave to 155° C., is held at the predetermined temperature for 300 minutes, and is cooled down to room temperature. A radical initiator B (2.0 wt. %), and methacrylate BGDMA (1.00 wt. %) are added to the resulting mixture. Catalyst N4 (0.0091 wt. %) is added at 30° C. This mixture is stirred for 10 minutes, thereafter is heated up to a temperature of 210° C. and is held at this temperature for 60 minutes, and thereafter is cooled down to room temperature. The material for proppant with the following properties is obtained thereby: Tg (C), compressive strength (B), and swelling (C).

INDUSTRIAL APPLICABILITY

As seen from the examples, the present technology allows for producing a polymer material having high physical and mechanical properties required for a proppant, primarily thermal resistance and strength.

The invention claimed is:
1. A method for producing a material for proppant, the method comprising:
 (i) obtaining a mixture of oligocyclopentadienes by heating dicyclopentadiene up to a temperature of 150-220° C. and holding at this temperature for 15-360 minutes, cooling the mixture down to 20-50° C.,
 (ii) sequentially adding the following components to the obtained mixture of oligocyclopentadienes:
  (a) at least one polymer stabilizer selected from the group consisting of tetrakis[methylene(3,5-di-tert-butyl-4-hydroxyhydrocinnamate)]methane, 2,6-di-tert-butyl-4-(dimethylamino)phenol, 1,3,5-trimethyl-2,4,6-tris(3,5-di-tert-butyl-4-hydroxybenzyl)benzene, tris(4-tert-butyl-3-hydroxy-2,6-dimethylbenzyl)isocyanurate, 3,5-di-tert-butyl-4-hydroxyanisole, 4,4'-methylenebis(2,6-di-tert-butylphenol), diphenylamine, para-di-tert-butylphenylenediamine, N,N'-diphenyl-1,4-phenylenediamine, tris(2,4-di-tert-butylphenyl)phosphite, tris(nonylphenyl)phosphite, bis(2,2,6,6-tetramethyl-4-piperidinyl)sebacate, bis(1-octyloxy-2,2,6,6-tetramethyl-4-piperidinyl)sebacate, bis(1-methyl-2,2,6,6-tetramethyl-4-piperidinyl)sebacate, 2-tert-butyl-6-(5-chloro-2H-benzotriazol-2-yl)-4-methylphenol, and 2-(2H-benzotriazol-2-yl)-4,6-bis(1-methyl-1-phenyl)phenol;
  (b) at least one radical initiator selected from the group consisting of di-tert-butyl peroxide, dicumyl peroxide, 2,3-dimethyl-2,3-diphenylbutane, and triphenylmethane;

(c) at least one methacrylate selected from the group consisting of allyl methacrylate, glycidyl methacrylate, ethylene glycol dimethacrylate, diethylene glycol dimethacrylate, butylene glycol dimethacrylate, 2-hydroxyethyl methacrylate, 2-hydroxypropyl methacrylate, tricyclodecane dimethanol dimethacrylate, ethoxylated bisphenol A dimethacrylate, and trimethylolpropane trimethacrylate; and (d) a catalyst which is a compound of the following general formula

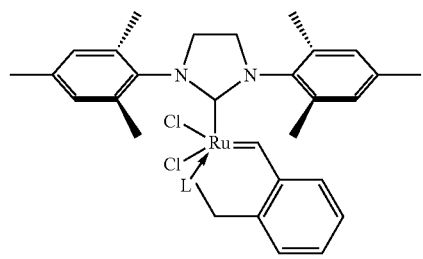

where the substituent L is selected from the group consisting of

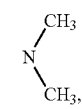
N

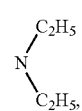
N1

N2

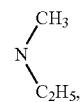
N3

(CH₂)₂OMe,
N4

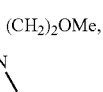
N5

N5b

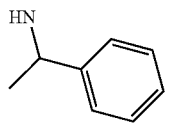
N1a

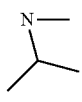

N6a

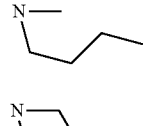
N11a

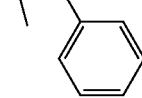
N16a

N1b

N2a

N7a

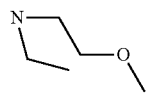
N12a

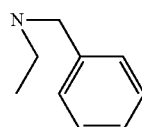
N17a

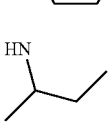
N2b

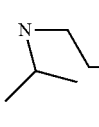
N3a

N8a

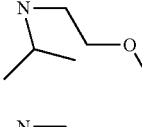
N13a

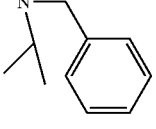
N18a

N3b 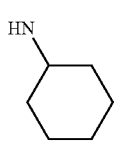

N4a 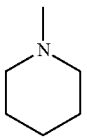

N9a 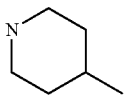

N14a 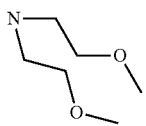

N19a 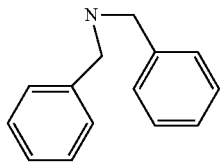

N4b 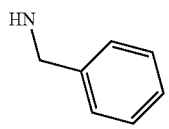

N5a 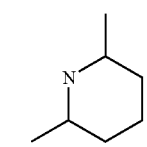

N10a 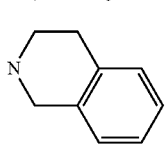

N15a 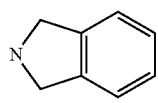

N20a 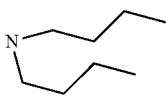

N1c 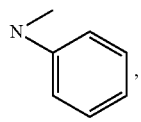

to obtain a polymer matrix, wherein the components of polymer matrix are present in the following amounts:
(p1) 0.1-3 wt % of the at least one polymer stabilizer;
(p2) 0.1-4 wt % of the at least one radical initiator;
(p3) 0.3-30 wt % of the at least one methacrylate;
(p4) 0.001-0.02 wt % of the catalyst; and
(p5) the mixture of oligocyclopentadienes as the balance, (iii) heating the polymer matrix up to a temperature of 50-340° C. and holding at this temperature for 1-360 minutes, and thereafter (iv) cooling the polymer matrix down to room temperature; thereby producing the material for proppant.

2. A material for proppant, characterized in that it is produced by the method according to claim 1.

3. A method for producing a material for proppant, the method comprising:
(i) obtaining a mixture of oligocyclopentadienes by heating dicyclopentadiene up to a temperature of 150-220° C. and holding at this temperature for 15-360 minutes,
(ii) cooling the mixture down to 20-50° C.,
(iii) sequentially adding the following components to the obtained mixture of oligocyclopentadienes:
(a) a polymer stabilizer comprising tetrakis[methylene (3,5-di-tert-butyl-4-hydroxyhydrocinnamate)]methane,
(b) a radical initiator comprising di-tert-butyl peroxide,
(c) a methacrylate; and
(d) a catalyst which is a compound of the following general formula:

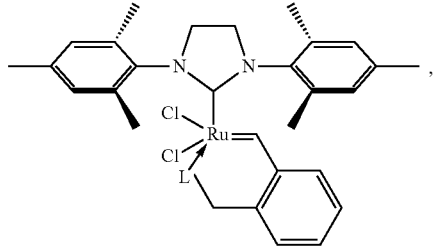

where the substituent L comprises a secondary amine group to obtain a polymer matrix, wherein the components of the polymer matrix are present in the following amounts:
(p1) 0.1-3 wt % of the polymer stabilizer;
(p2) the radical initiator or a mixture of initiators 0.1-4 wt % of the radical initiator;
(p3) 0.3-30% wt % of the methacrylate;
(p4) 0.001-0.02 wt % of the catalyst; and
(p5) the mixture of oligocyclopentadienes as the balance, (iv) heating the polymer matrix up to a temperature of 50-340° C. and holding at this temperature for 1-360 minutes, and thereafter (v) cooling the polymer matrix down to room temperature; thereby forming the proppant.

4. A material for proppant produced by the method according to claim 3.

* * * * *